United States Patent [19]
Chen

[11] Patent Number: 6,102,500
[45] Date of Patent: Aug. 15, 2000

[54] COMPUTER FRAME ASSEMBLY

[76] Inventor: Ching Mien Chen, 3F, No. 5, Alley 10, Lane 437, Sec. 2, Pa-Te Road, Taipei, Taiwan

[21] Appl. No.: 09/293,789

[22] Filed: Apr. 20, 1999

[51] Int. Cl.[7] .................................................. A47B 81/00
[52] U.S. Cl. ..................... 312/223.2; 361/727; 312/302
[58] Field of Search ........................ 312/223.2, 249.9, 312/249.11, 330.1, 334.27, 334.39; 361/683, 684, 685, 686, 723, 725, 727

[56] References Cited

U.S. PATENT DOCUMENTS

| 4,874,209 | 10/1989 | Spitzer et al. | 312/249.9 |
| 5,566,383 | 10/1996 | Gildea et al. | 361/685 |
| 5,768,097 | 6/1998 | Jelinger | 361/683 |
| 5,774,337 | 6/1998 | Lee et al. | 312/249.9 |

*Primary Examiner*—Peter M. Cuomo
*Assistant Examiner*—Michael J. Fisher
*Attorney, Agent, or Firm*—Bacon & Thomas PLLC

[57] ABSTRACT

A computer frame assembly including a case having a front face on which a panel is secured thereon. The panel includes a plurality of slots. The case includes a sidewall having an inner surface and at least two substantially U-shaped tracks running along the length of the inner surface of the sidewall and an open end of which at least one flange having at least one hole is defined therein. The computer frame assembly includes a frame 3 having an outer side. The outer side includes an outer surface. At least two pairs of rollers are mounted on the outer surface of the outer side of the frame and are rotatably received in the tracks so that the frame can be slidably inserted or removed from the case. The frame includes at least one positioning hole defined on the back face of the frame. The holes of the flange correspond to the positioning holes of the back face of the frame, such that when the respective holes are aligned, the frame and the case are aligned as well and secured together by fasteners. The computer frame assembly includes hinges that are mounted on the outer side of the frame and configured for pivotably mounting a power supply or a floppy disk drive or other computer peripheral.

3 Claims, 5 Drawing Sheets

COMPUTER FRAME ASSEMBLY

BACKGROUND OF THE INVENTION

1. Field of the Invention

The present invention relates to a computer frame assembly, and more particularly to a computer frame assembly enabling a user to easily and readily separate a case from a base.

2. Description of Related Art

Referring to FIG. 1, normally, the heart of a desktop computer is protected in a frame assembly including a frame (4) having a CD ROM and a plurality of operational hardware mounted thereon, a substantially three-sided or U-shaped case (5) threadedly connected to the frame (4) and a base (6) securely connected to the frame (4) and having a plurality of ports mounted thereon for receiving cartridges therein.

As the duration and the number of operations for using the computer increase, the likelihood of the computer malfunctioning also increases. In order to proceed with the maintenance of the computer, the operator has to separate the case (5) from the frame (4). However, due to the shape of the case (5), with an open side, the case (5) is easily deformed (it becomes overly expanded) when it is separated from the frame (4). Therefore, during reassembly, the operator not only needs to maintain the expanded/deformed case (5) in shape, but also align the respective fastening holes of the case (5) to the frame (4) so that fasteners such as screws can securely connect the case (5) to the frame (4) together. This process wastes time and is labor intensive.

It is noted from the above description that an improvement to the current computer frame assembly is needed.

The present invention provides an improved computer frame assembly to mitigate and/or obviate the aforementioned problems.

SUMMARY OF THE INVENTION

The main objective of the invention is to provide a computer frame assembly that allows a user to easily and readily separate the case from the frame.

In one aspect of the invention, the frame assembly constructed in accordance with the present invention comprises a case having a panel provided on a front face thereof and peripherally defining therein a plurality of slots, a bottom having at least two substantially U-shaped tracks defined therein and an open end and a frame slidably received in the case and having at least two pairs of rollers mounted on a bottom thereof and rotatably received in the tracks, a plurality of positioning holes defined in a back face thereof and a plurality of hinges mounted on the bottom. With such an arrangement, the frame is able to be slidably removed from the case and the user is able to easily proceed with maintenance, after which the frame is easily returned to the case in the same sliding manner.

Other advantages and features of the invention will be better understood with reference to the following drawings and the detailed description thereof.

DETAILED DESCRIPTION OF THE INVENTION

Figure 1:
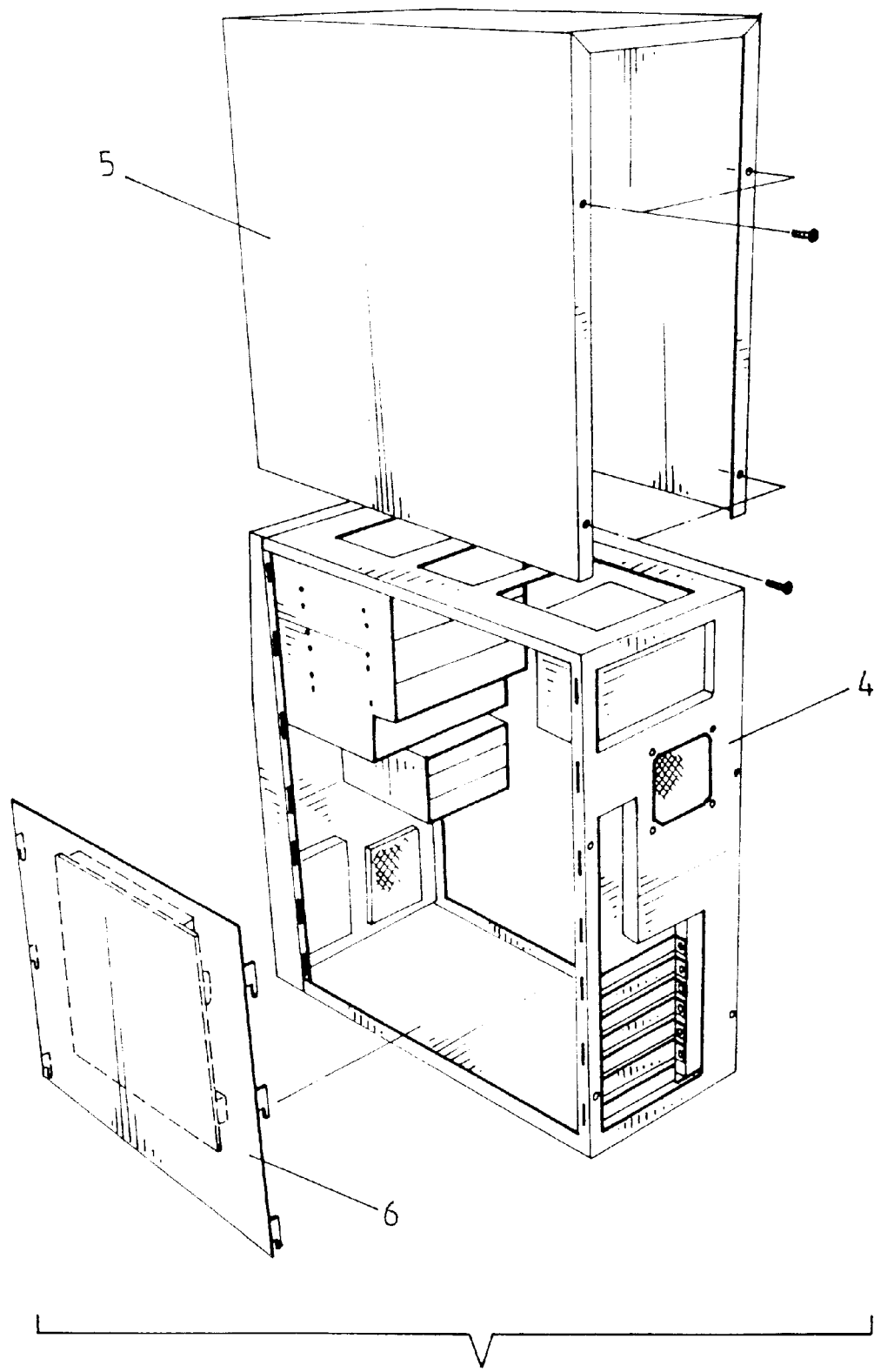
FIG. 1 is an exploded perspective view of a conventional computer frame assembly.
Figure 2:
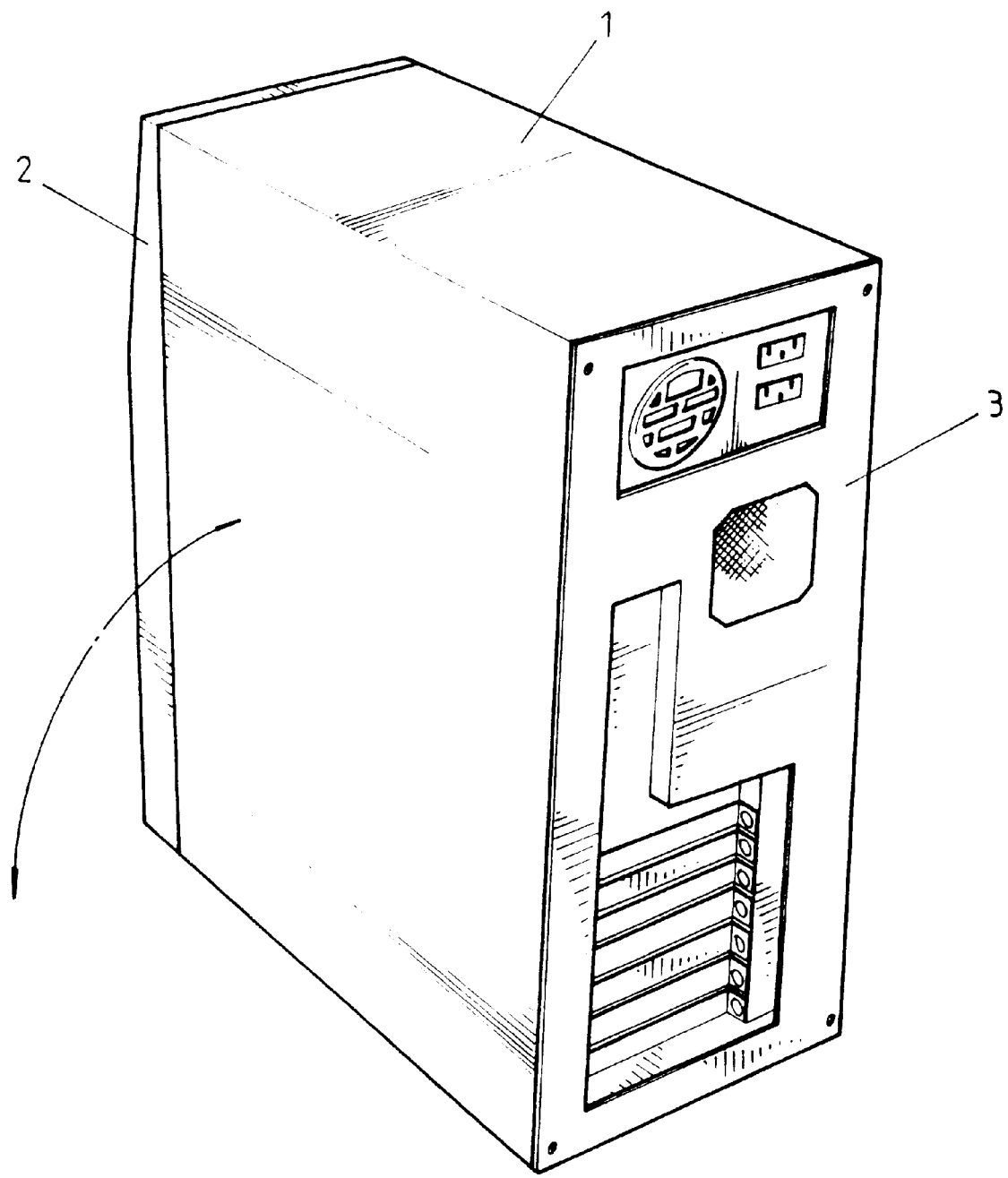
FIG. 2 is a perspective view of a computer frame assembly constructed in accordance with the present invention.
Figure 3:
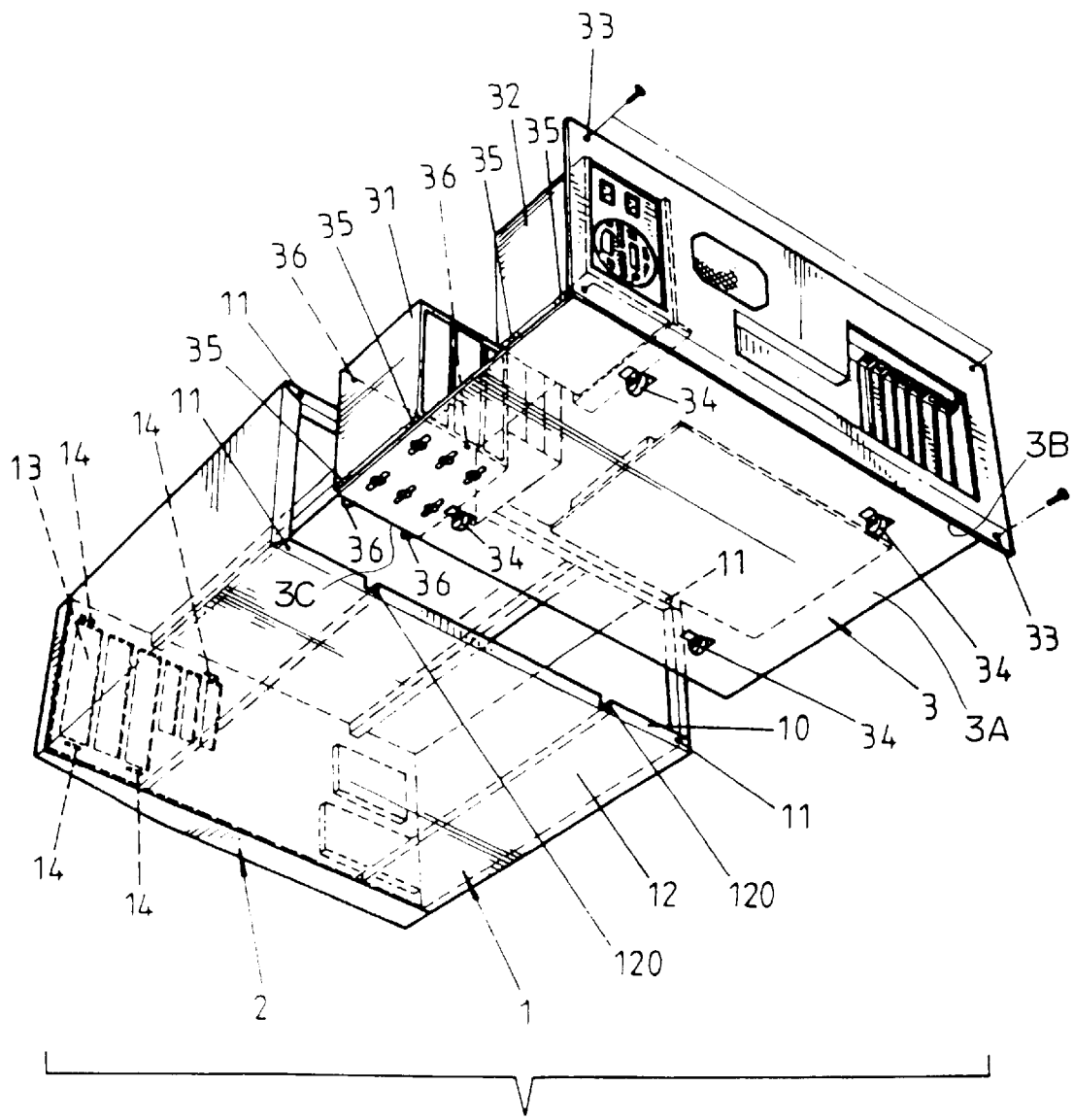
FIG. 3 is an exploded perspective view of the computer frame assembly of the invention.
Figure 4:
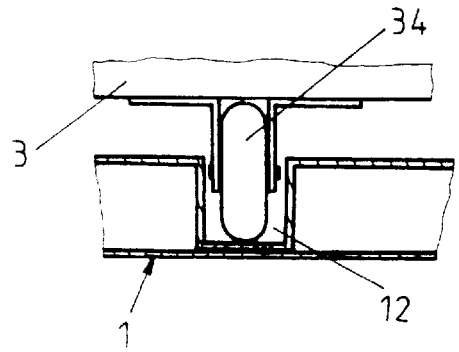
FIG. 4 is a partially enlarged view showing a roller being rotatably received in a U-shaped track.

Referring to FIGS. 2 and 3, a computer frame assembly constructed in accordance with the present invention is shown. The computer frame assembly comprises a case (1) having a panel (2) securely provided on a front face thereof and peripherally defining therein a plurality of slots (13), a least one sidewall (12) having at least two spaced apart and substantially U-shaped tracks (120) running along the horizontal length of the sidewall (12) and an open end (not numbered), and a frame (3) having at least two pairs of rollers (34) mounted on the outer side (3A) of the frame (3) and rotatably received in the tracks (120) so that the frame (3) can be slidably inserted or removed from the case (1). The frame (3) includes a plurality of positioning holes (33) defined in a back face (3B) thereof and a plurality of hinges (35) mounted on the outer side (3A) of the frame (3). At the open end of the case (1), a plurality of flanges (10) are formed inwardly to form inward surfaces for the back face (3B) of the frame (3) to rest on. The flanges (10) have a plurality of holes (11), each flange hole (11) defined to correspond to one of the plurality of positioning holes (33) of the back face (3B) of the frame (3). With such an arrangement, the frame (3) is able to be slidably received in the case (1) via the rollers (34) rotatably received in the U-shaped track (120), as shown in FIG. 4. Therefore, after the alignment between the plurality of holes (11) of the case (1) and the respective plurality of positioning holes (33) of the frame (3), the frame (3) and the case (1) can be securely combined, preferably by screws (not numbered) threadedly inserted into the aligned holes (11) and the positioning holes (33).

Figure 5:
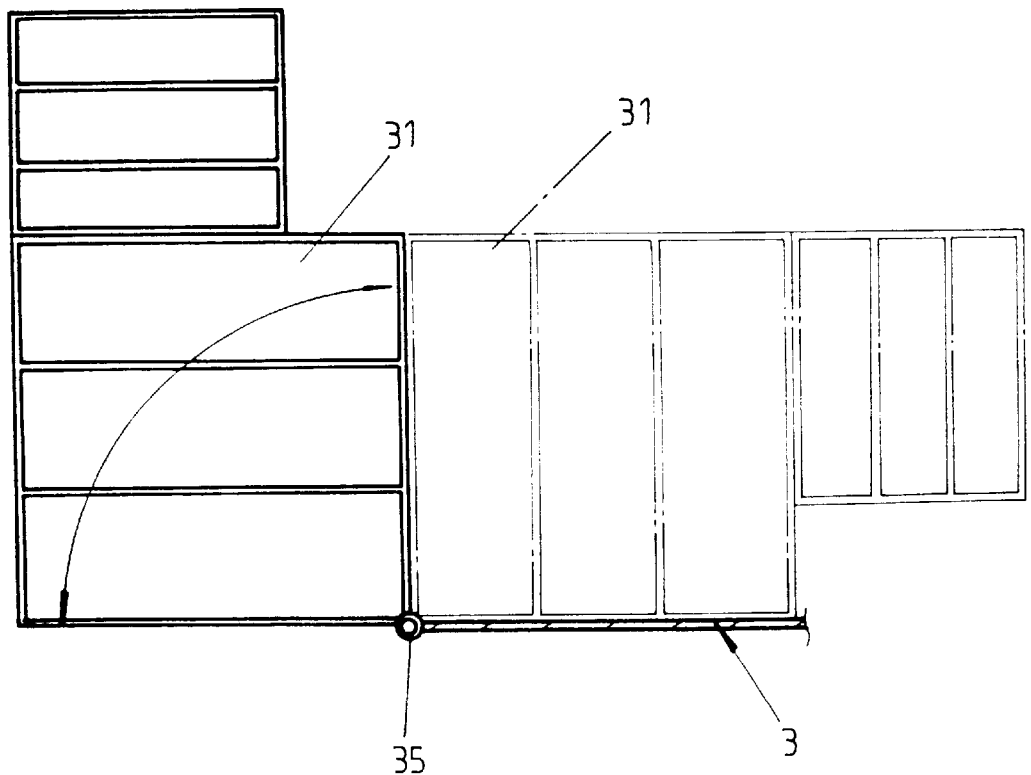
FIG. 5 is a schematic view showing the hardware of the computer being pivotally mounted on a bottom of the frame via hinges.
Figure 6:
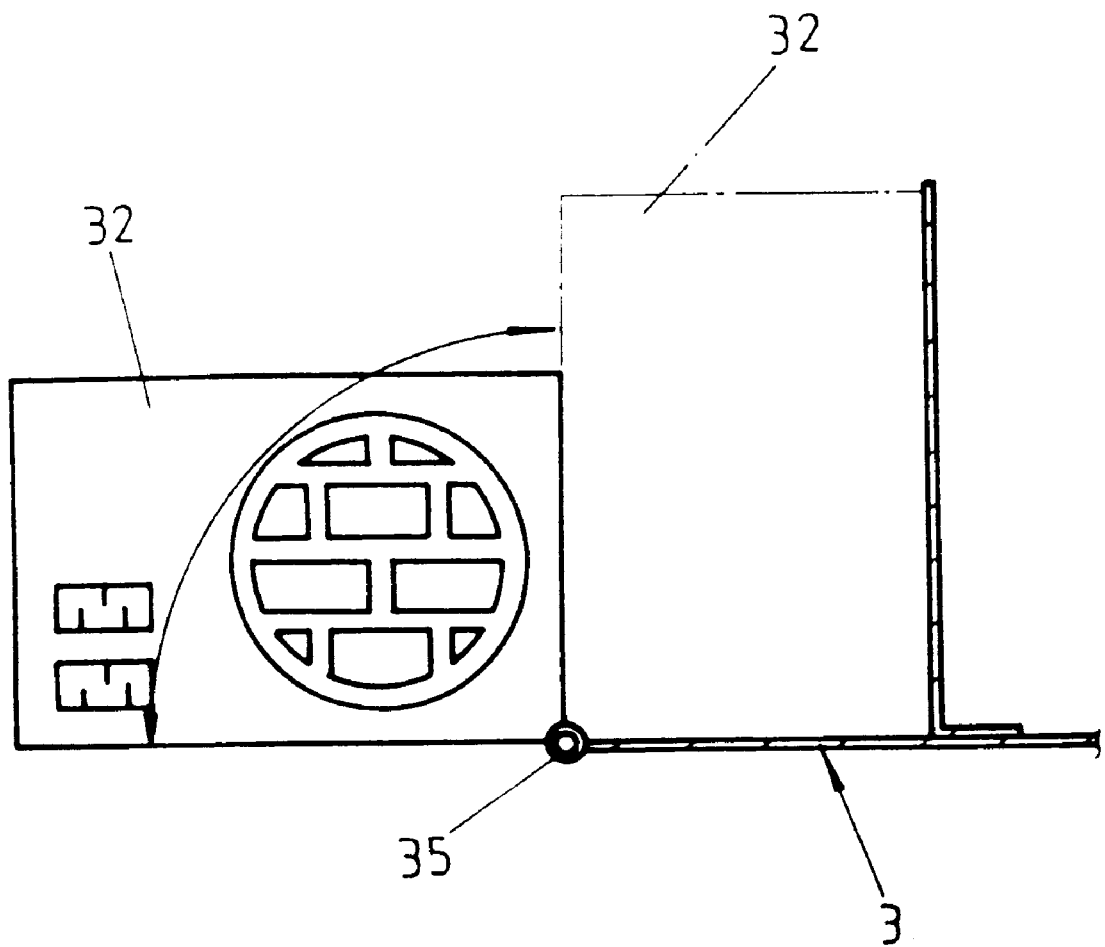
FIG. 6 is a schematic view showing a power supply being pivotally mounted onto the frame via the hinge.

The hinges (35) are used to pivotally connect a floppy disk drive (31) and a power supply (32) to the outer side (3A) of the frame (3), such that either the floppy disk (31) or the power supply (32) can be accessed easily for maintenance, as shown in FIGS. 5 and 6. Furthermore, a plurality of projections (36) are formed on a front face (3C) of the frame (3) substantially perpendicular to the outer surface of outer side (3A) correspondingly fit into each one of the plurality of slots (14) defined in the panel (2). After the frame (3) is received in the case (1), the projections (36) extend into corresponding slits (14) of the case (1) and form a friction fit therein.

It is to be noted from the description above that the computer frame assembly of the invention permits easy assembly and disassembly of the frame (3) from the case (1), and maintenance work to the power supply (32) or the floppy disk drive (31) can be initiated by pivoting the power supply (32) or the floppy disk drive (31) along the hinges (35), as shown in FIGS. 5 and 6.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts withing the principles of the invention to the full extent indicated by the broad general meaning of the terms in which the appended claims are expressed. It should also be noted that those skilled in the art are able to make amendment, alternations and changes according to the detailed description of the preferred embodiment. However, those alterations, changes and/or amendments should also be included in the principle of the invention as claimed in the appended claims.

The present invention is by no means restricted to the above-described preferred embodiments, but covers all variations that might be implemented by using equivalent functional elements or devices that would be apparent to a person skilled in the art, or modifications that fall within the spirit and scope of the amended claims.

What is claimed is:

1. A computer frame assembly comprising:

a case (1) having a front face (3C) on which a panel (2) is secured thereon, the panel including a plurality of slots (13), the case (1) including a sidewall (12) having an inner surface and at least two substantially U-shaped tracks (120) running along the length of the inner surface of the sidewall (12) and an open end on which at least one flange (10) having at least one hole is defined therein;

a frame (3) having an outer side (3A), the outer side (3A) having an outer surface, at least two pairs of rollers (34) mounted on the outer surface of the outer side (3A) of the frame (3) and rotatably received in the tracks (120) so that the frame (3) can be slidably inserted or removed from the case (1), the frame (3) includes at least one positioning hole (33) defined on the back face (3B) of the frame (3); and the at least one hole of the at least one flange (10) corresponding to the at least one positioning hole (33) of the back face (3B) of the frame (3), such that when the respective holes are aligned, the frame (3) and the case (1) are aligned and secured together by fasteners.

2. The computer frame assembly has recited in claim 1, wherein hinges (35) are mounted on the outer side (3A) of the frame (3) and configured for pivotally mounting a power supply (32) or a floppy disk drive (31).

3. The computer frame assembly has recited in claim 2, wherein the frame (3) includes a plurality of projections (36) that are formed thereon facing toward the panel (12), the panel (2) including a plurality of slits (14), each of the projections (36) corresponding to one of the plurality of slits (14) such that the projections (36) can be frictionally inserted into the slits (14), to detachably connect the frame (3) to the panel (2).

* * * * *